United States Patent [19]

Preiss et al.

[11] Patent Number: 4,672,369
[45] Date of Patent: Jun. 9, 1987

[54] SYSTEM AND METHOD FOR SMOOTHING THE LINES AND EDGES OF AN IMAGE ON A RASTER-SCAN DISPLAY

[75] Inventors: Richard B. Preiss, Beaverton; John C. Dalrymple, Newberg, both of Oreg.

[73] Assignee: Tektronix, Inc., Beaverton, Oreg.

[21] Appl. No.: 549,144

[22] Filed: Nov. 7, 1983

[51] Int. Cl.$^4$ .............................................. G09G 1/06
[52] U.S. Cl. .................................. 340/728; 340/731; 340/723
[58] Field of Search ............... 340/728, 723, 731, 744, 340/747, 803, 804, 811, 812

[56] References Cited

U.S. PATENT DOCUMENTS

| | | | |
|---|---|---|---|
| 4,215,414 | 7/1980 | Huelsman | 340/728 |
| 4,366,475 | 12/1982 | Kishi et al. | 340/731 |
| 4,412,252 | 10/1983 | Moore et al. | 340/731 |
| 4,532,605 | 6/1985 | Waller | 340/731 |
| 4,533,909 | 8/1985 | Sander | 340/803 |

FOREIGN PATENT DOCUMENTS 0085351 8/1983 European Pat. Off. ............ 340/731
0136227 10/1979 Japan ................................... 340/731

Primary Examiner—Gerald L. Brigance
Assistant Examiner—Jeffery A. Brier
Attorney, Agent, or Firm—Allston L. Jones; Robert S. Hulse

[57] ABSTRACT

In system and method for smooth line raster-scan display, a frame buffer containing a high resolution map of information of an image for display is read so as to furnish plural line stored information for each single line of the raster display. Display circuitry of the system receives the plural line stored information and varyingly weights same to furnish such single line Z-axis information (intensity control) for an X-Y display matrix, such as a CRT display terminal. Means are included in the system for display of the entire frame buffer content on a first fractional basis, e.g., a two thousand line resolution buffer to five hundred line raster. Selection circuitry of the system provides for reading out only a fraction of the frame buffer content, e.g., one-fourth or the five hundred lines thereof, on five hundred raster lines, thus providing true resolution zoom capability.

4 Claims, 5 Drawing Figures

4,672,369

SYSTEM AND METHOD FOR SMOOTHING THE LINES AND EDGES OF AN IMAGE ON A RASTER-SCAN DISPLAY

FIELD OF THE INVENTION

This invention relates generally to image display and pertains more particularly to the generation of smooth lines and edges of images in raster-scan type displays.

BACKGROUND OF THE INVENTION

In certain raster-scan type display systems, it is typical to regard the display screen as being a five hundred by five hundred pixel (picture element) matrix and to provide Z-axis or intensity control on a per pixel basis. Due to the fixed locations of the raster pixels, image line presentation can, if not compensated for, appear in the display in a staircase structure, i.e., a so-called "jaggied" presentation. Anti-aliasing or anti-jaggied (de-jaggied) display compensating systems and methods have thus evolved, and are in two presently known general versions.

In one general type of anti-aliasing system and method, the industry looks to anti-jaggied software to drive the image into a terminal which is particularly and necessarily dedicated to the driving software. This approach is characterized by severe performance and data handling time limitations.

In the other general type of anti-aliasing pixel raster approach, the industry looks to higher performance through firmware. The firmware is situated in a display terminal which receives the image data and the firmware manipulates the image data bits through a fixed algorithm and then writes same into a frame buffer memory so as to have the image data weighted according to a fixed pattern.

While the firmware approach presents less of a performance problem, as above noted, both known approaches have what many users view to be a decreased focusing, i.e., a lower than desired resolution in the amount of image one can view. Thus, the resulting image is not the result of real time reproduction, but is the product of a practice in which information is added to the image defined in the original image data.

SUMMARY OF THE INVENTION

The primary object of this invention is to provide improved method and system for raster-scan type display.

A more particular object of the invention is to provide improved method and system for presentation of anti-aliased line images in a raster-scan type display.

A still further object of the invention is the provision of high resolution in image display in raster-scan displays and true resolution zoom capability.

In attaining these and other objects, the invention approaches the anti-aliasing aspect of raster-scan type display by use of image data without need for adding anti-jaggied algorithm data thereto, by software or firmware. The method of the invention uses, at its starting point, a frame buffer loaded with image data in greater density than the raster-scan display screen density. For example, a frame buffer used in the present method may contain a row/column matrix of two thousand by two thousand to drive a raster of five hundred by five hundred.

Image data is processed in the present system concurrently by selecting plural adjacent frame buffer line data from frame buffer memory, and a single raster line drive signal is generated from plural adjacent buffer line data bits by selective weighting thereof. The center of the plural adjacent lines is considered to correspond with the raster line being written and is given its full weight with lines adjacent such center being weighted differently in accordance with their distance from such center.

The generated raster line drive signal accordingly can have a Guassian distribution therein, akin to television display practice, and the invention thus provides a full resolution image in which lines are rendered accurate and unjaggied and without end point difficulty, in the absence of any anti-aliasing algorithm or related frame buffer data additions of data to original image data.

In a further aspect, the invention imparts a zoom capability to raster-scan type display. Thus, by decreasing the selection rate, a corresponding fraction of the frame buffer is assigned to the entirety of the display screen, with true resolution accompanying the enlarged display.

The foregoing and other objects and features of the invention will be further evident from the following detailed discussion of a preferred embodiment of a system in accordance with the invention and the method thereof and from the drawings wherein like reference numerals identify like parts throughout.

DESCRIPTION OF THE PREFERRED EMBODIMENT AND PRACTICE

Figure 1:
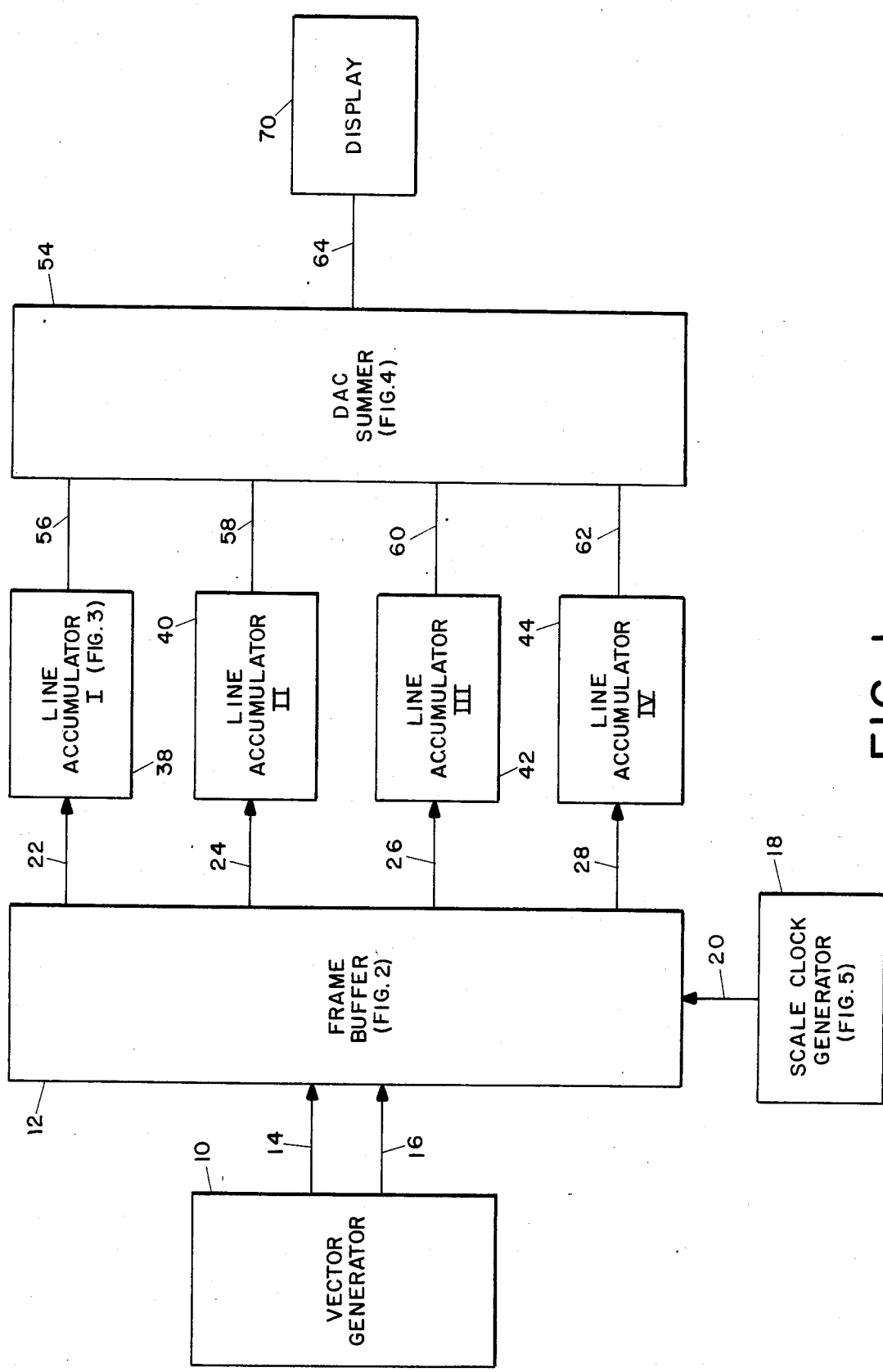
FIG. 1 is a block diagram of a system in accordance with the invention.

Referring to FIG. 1, vector generator 10 provides input image data and address/timing commands to frame buffer 12 respectively over lines 14 and 16. Unit 10 is a data routing and timing control unit, serving to fill and read the random access memory (RAM) units of frame buffer 12, to modify or process stored data through write, erase and refresh operations, and to perform other customary operations of presently known vector generators of raster-scan display systems. As noted above, frame buffer 12 is of high resolution capacity, being suitably filled with data in amount which is a multiple of the row-column data capacity of a display terminal.

Scale clock generator 18 furnishes frame buffer output clock signals over line 20 to frame buffer 12. The rate of occurrence of the latter signals on line 20 will be at a given clock rate in the absence of zooming operations, and will decrease from such given rate in the course of zoom practices, as is covered below. The frame buffer output signals are applied over lines 22–28 to line accumulators I–IV, identified by reference numerals 38–44. In broad reach, these accumulators serve to store currently received information to permit output thereof on lines 56-62 concurrently with earlier received information.

DAC summer 54 is digital-to-analog converter which carries out the above-mentioned weighting operation on received information and furnishes corresponding analog output (video) signal on line 64 to display unit 70, typically a CRT terminal.

Figure 2:
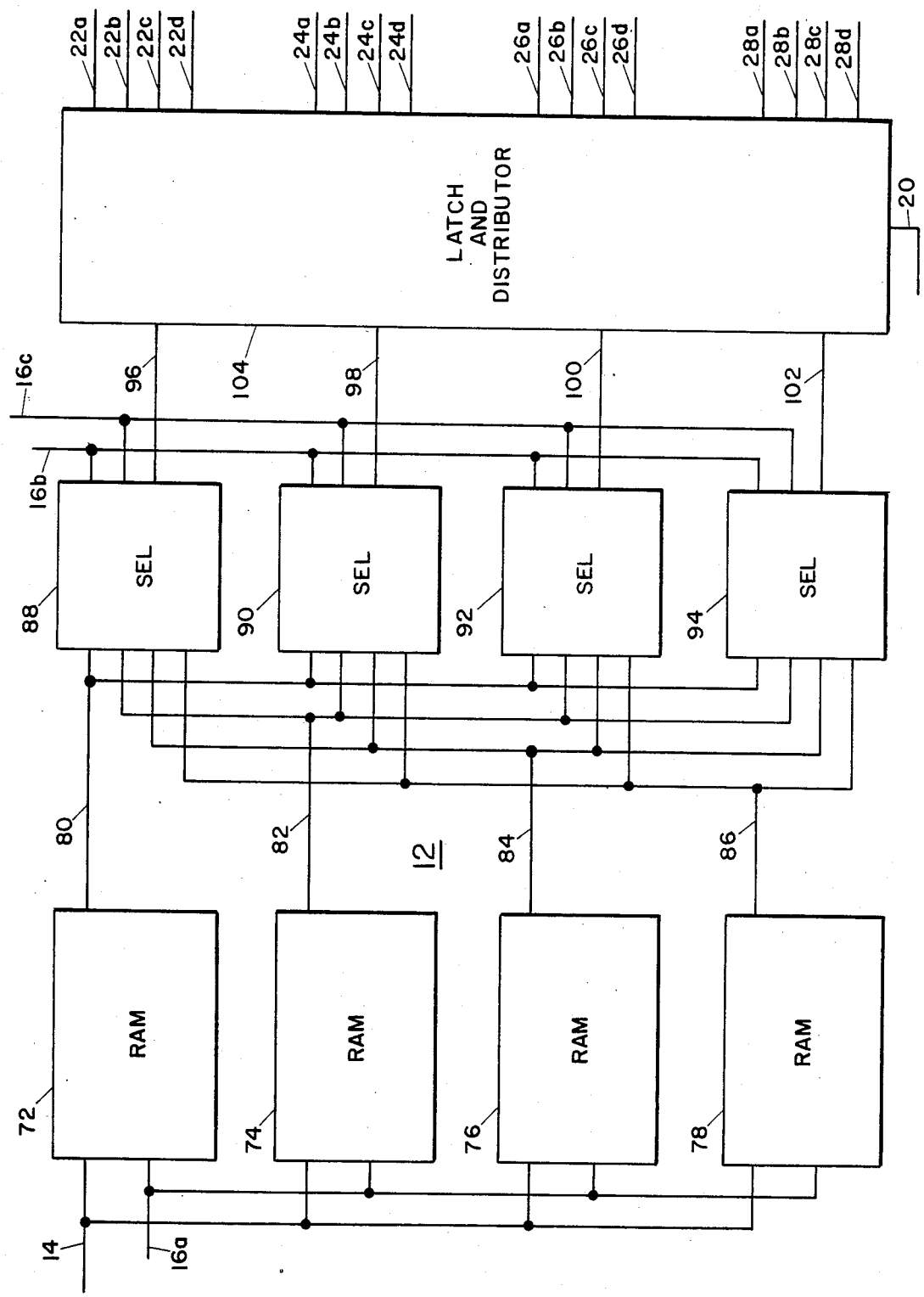
FIG. 2 is a schematic diagram of the frame buffer of the FIG. 1 system.

Turning now to FIG. 2, frame buffer 12 includes RAM units 72-78 which are fed by data bus 14 and address/timing bus 16a. The outputs of the RAM units are applied to lines 80-86 which jointly feed four data bits (one frame buffer image scan line) at a time to selector units 88-94. Control selection signals on lines 16b and 16c gate four-bit pattern onto selector unit output lines 96-102. Latch and distributor 104 receives the current four data bits from units 88-94 and distributes same on the occurrence of a clocking signal (frame buffer output clock) on line 20 selectively among output lines 22a-d through 28a-d of the frame buffer.

Figure 3:
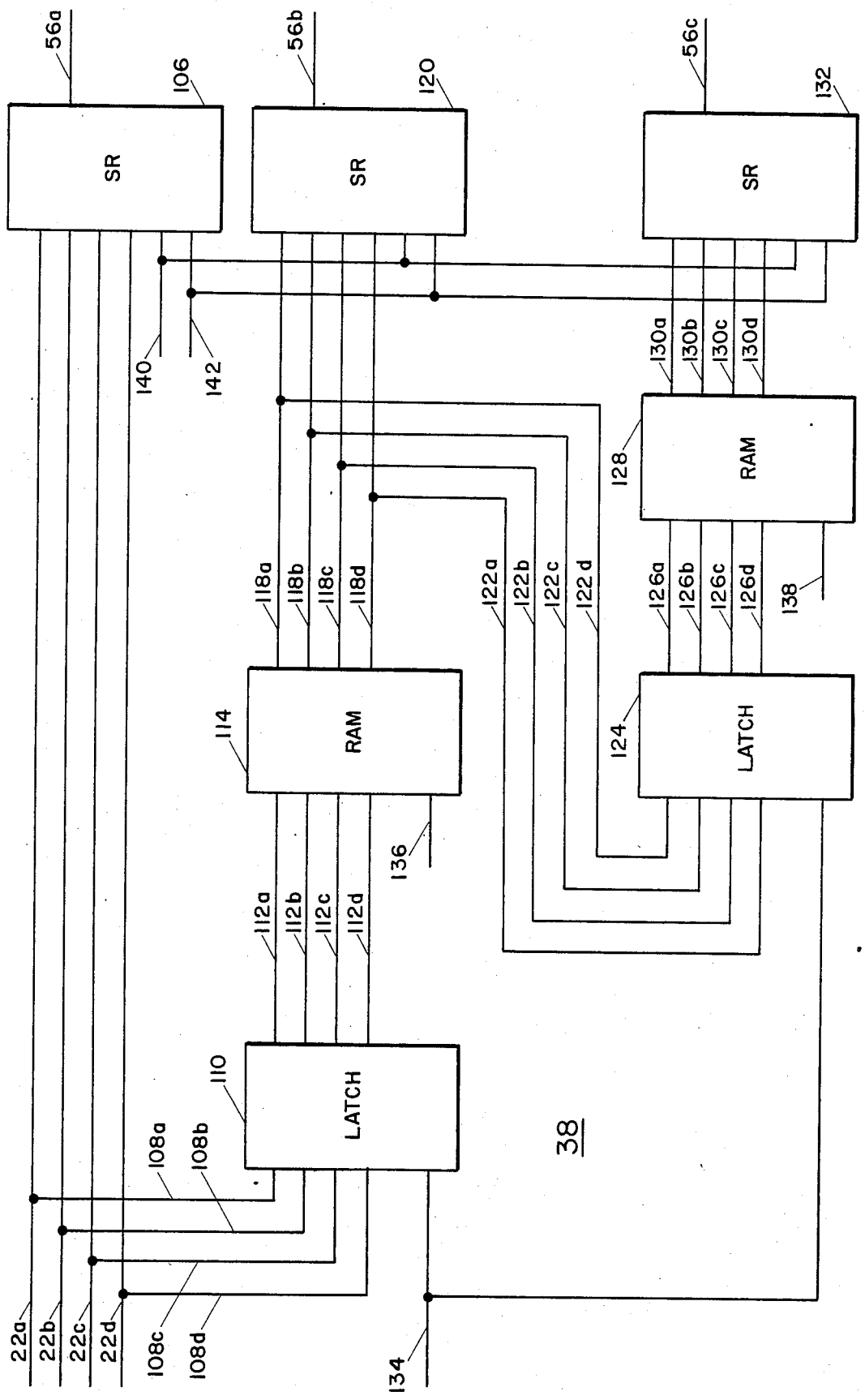
FIG. 3 is a schematic drawing of a line accumulator, used as each of units 38–44 of FIG. 1.

Referring again to FIG. 1, the output lines just discussed, 22-28, are associated in individual groupings with line accumulators 38-44. FIG. 3 depicts circuitry for each such line accumulator, being particularized, by input/output connections to accumulator 38. Lines 22a-d are applied directly to shift register 106 and also over lines 108a-d to latch 110. Accordingly, the four-bit pattern input to accumulator 38 is made available for immediate readout through shift register 106 and is retained for later use, since latch 110 applies the same pattern over lines 112a-d to RAM 114. The RAM 114 output lines 118a-d feed a second shift register 120.

Lines 118a-d are also connected to lines 122a-d whereby RAM 114 output may also be conserved for still later display. These lines feed latch 124 whose output lines 126a-d are applied to RAM 128. The RAM 128 output is furnished over lines 130a-d to shift register 132.

Control lines 134, 136 and 138 control latches 110 and 124 and RAMS 114 and 128, the latter lines serving both the function of storage addressing and output selection. Line 140 applies an enable signal (line accumulator enable) in common to shift registers 106, 120 and 132. Line 142 provides a clock pulse which, in the presence of the line 140 enable signal, serializes the contents of the shift registers onto output lines 56a, 56b and 56c of line accumulator 38. The line accumulator output signals on lines 56a, b and c occur at a rate corresponding to the rate of occurrence of the display unit raster-scan line rate.

As will now be appreciated, the contents of the shift registers 106, 120 and 132 represent the current (present) four bit pattern input to the line accumulator (resident in shift register 106), the immediately preceeding pattern which was presented to the line accumulator (resident in shift register 120) and the further preceeding four bit pattern which was presented to the line accumulator (resident in shift register 132) respectively. Like arrangements to the above-described in connection with FIG. 3 comprise the line accumulators 40-44.

In other words, frame buffer 12 is a bank of RAM memory (72-78), from which four scan lines of information are scanned at a time on lines 80-86 (FIG. 2). The selectors, latch, and distributor are a means of multiplexing and distributing the data bits out on lines 22abc-d-28abcd in such a manner as to reduce clocking speed requirements on the logic. Rather than using very long shift registers, this approach based on RAM and multiplexing, was used. FIG. 3 is one of four line accumulator circuits which store the scan line information. The present four lines feed output shift register 106. The previous four lines are stored and delayed by latch 110 and RAM 114 and then fed to shift 120. Likewise, the four lines previous to that are stored and delayed through latch 124, RAM 128, and fed to register 132. Thus, a 12-high column of data bits is developed.

Figure 4:
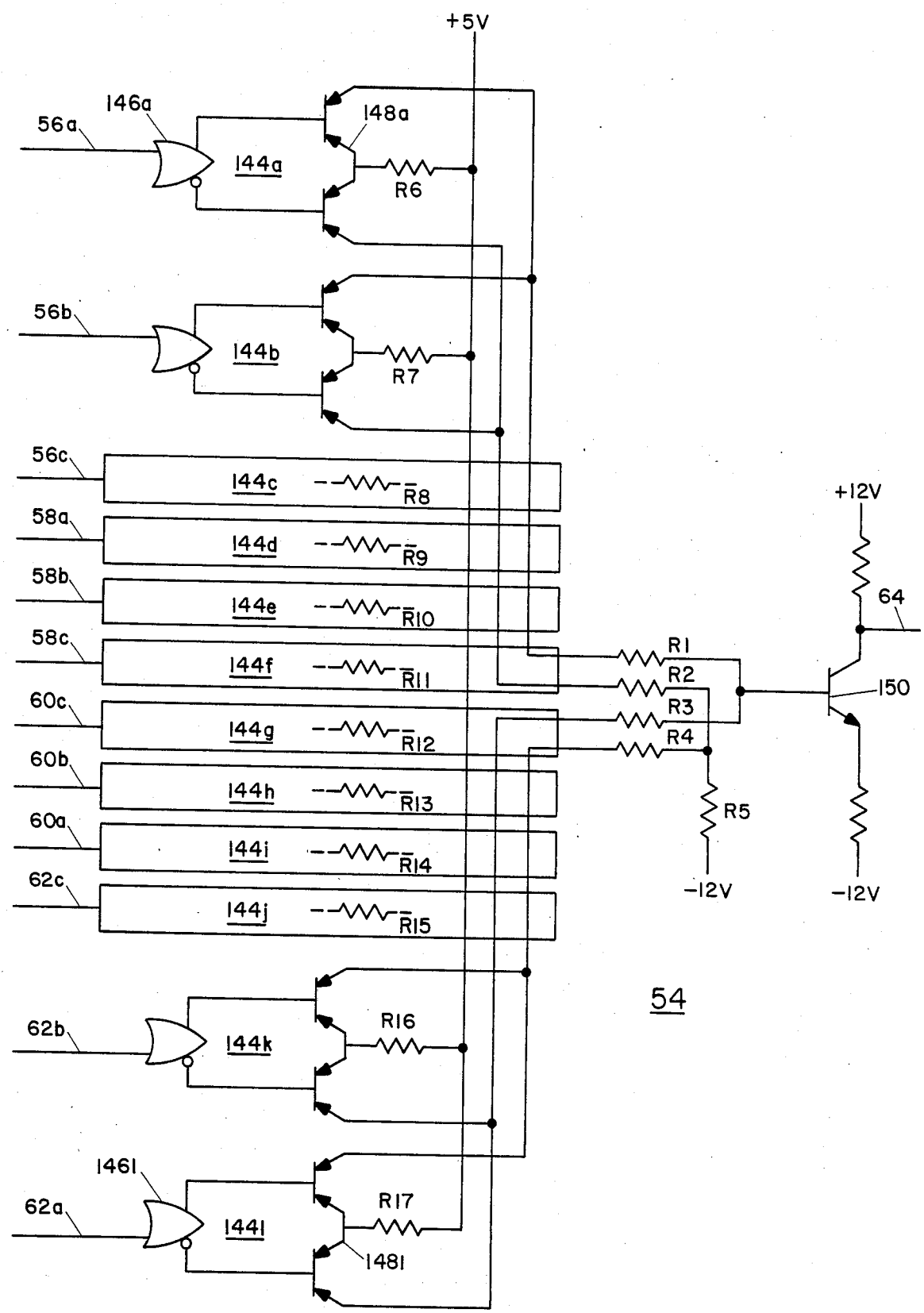
FIG. 4 is a circuit schematic of DAC summer 54 of FIG. 1.

Referring again to FIG. 1, since lines 56, 58, 60 and 62 each involve a grouping of three lines having serialized data of current, preceeding and further preceeding four bit patterns, DAC summer 54 has twelve input lines thereto, more particularly shown in FIG. 4 with associated weighting circuitry. Each of the input lines is connected to a gating and weighting (G-W) circuit 144a-l. Each such circuit is commonly configured, including a gate 146a-146l applying its complementary outputs to the bases of a pair of emitter-coupled transistors, as in stage 148a. Collectors of the transistors of G-W circuits 144a-144f are connected in common to resistors R1 and R2. The collectors of the lower transistors of G-W circuits 144g-144l are connected in common to resistors R3 and R4. Resistors R1 and R3 are coupled to the base of video output transistor 150 and resistors R2 and R4 are connected through resistor R5 to a negative twelve volt d.c. supply. Video output on line 64 is the collector voltage of transistor 150.

The weighting profile is established by the values selected for resistors R6-R17 of FIG. 4, which are all connected to a positive five volt d.c. supply, and together with resistors R1-R5 and the logic states of lines 56, 58, 60 and 62 set current flow in the transistor individual stages and hence determine contribution of the stages of the video signal. For Gaussian weighting, resistors at outermost positions from the central lines are at highest ohmic value, with ohmic values decreasing therefrom as one approaches the central lines. In the particularized embodiment, central resistors R11 and R12 are equal and of lowest value, R10 and R13 are equal and of higher value, R9 and R14 are equal and of still higher value, etc. The resistors R6-R17 may be variable, for example, such that their values may be established by external control, such as a microprocessor.

In normal full scale operation, the twelve bit pattern on lines 56a-c, 58a-c, 60a-c and 62a-c represents a vertical slice (column) of frame buffer memory containing respective individual bits of twelve lines of information. The center of such twelve lines (midway between the sixth and seventh lines—between circuit lines 58c and 60c) corresponds to the raster line being written. Upon display of the resulting video signal on line 64, thus derived as a Guassian weighted signal, timing is such that the input lines to DAC summer 54 represent twelve frame buffer lines stepped by four from the first-mentioned input to unit 54. This is so for the example at hand, since frame buffer density is four times that of raster scan density and one desires to display the full stored image on the display raster. Thus, each raster line is written by a unique pattern of twelve bits from twelve mutually adjacent frame buffer lines and successive raster lines involve a four row stepping of line accumulators 38-44. The clock rate at line 20 (frame buffer line output) is thus four times the rate of the line accumulator output signal on lines 56, 58, 60 and 62.

In zoom operation of the type where one desires, for instance, to assign full display screen area to one-quarter of the frame buffer content, i.e., a zoom to increase by four a one-quarter section of the normal display, indication of such zoom selection is made to scale clock generator 18 on lines 154a–d (FIG. 5), which feed four-bit counter 156. A twenty kilohertz clock signal is applied also to counter 156 from divider 158 over line 160. Oscillator 162 operates at eighty kilohertz and drives divider 158 over line 164. Gate 166 has inputs on line 168 from counter 156 and the twenty Khz clock on line 170. The frame buffer output shift clock is provided on line 20 and will be at a rate corresponding to the settings of lines 154a–d, i.e., at maximum (twenty Khz) where normal full scale operation is desired and at corresponding lower rates during zoom operation. In the zoom example under discussion, a fourfold magnification will yield a correspondence as between frame buffer line output and raster scan line with the line 20 clock rate now at five Khz, i.e., at the line 140 rate. While video output is line for line with frame buffer readout, it is still Guassian weighted since the line accumulators still provide the full twelve mutually adjacent line bits to DAC summer 54.

Figure 5:
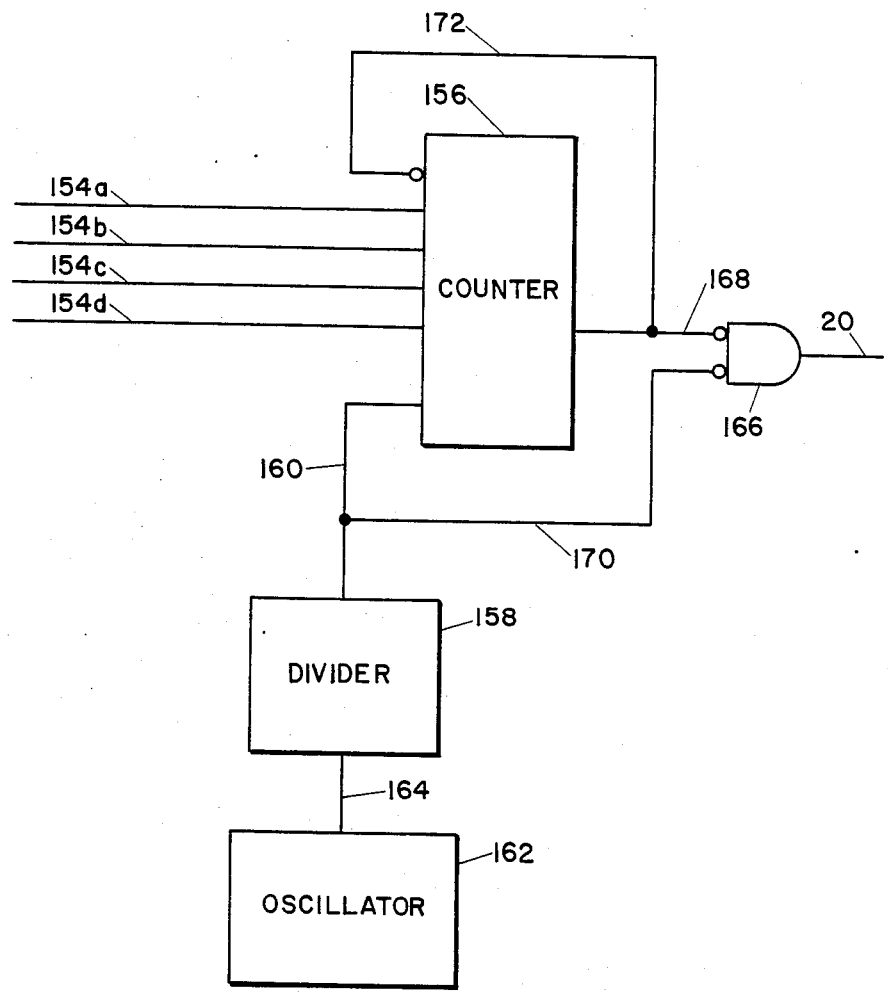
FIG. 5 is schematic diagram of the scale system clock generator of FIG. 1.

By way of particular implementation of FIG. 5 circuitry, counter 156 may be a 10016 four-bit counter with lines 154a–d connected to pins numbered seven, nine, ten and eleven, line 160 connected to pin thirteen, line 172 connected to pin five and with lines 172 and 168 connected to pin four.

Considering the method for effecting display of an image in accordance with the invention, a display unit may be said to have N raster scan lines. The image is stored in high density, i.e., in M stored lines of digital bits, M being selected as an integral multiple of N. In writing a given raster scan line, one selects a digital bit from each of Q of the M stored lines, Q being selected as an integer exceeding unity. In the non-zoom example discussed above, M is two thousand, N is five hundred and Q is twelve, since it is the output of the four line accumulators. One now converts the Q bits selected into an analog signal and uses the analog signal as an intensity control signal in writing in one of the N raster lines of said display unit.

One individually weights the bits in the course of the signal conversion and the weighting practice preferably provides a Guassian distribution of the bits.

The Q bits are selected in the particularly described practice by selecting same in subgroupings and by sequentially accumulating the subgrouped bits for practice of the signal conversion step concurrently as to the entire Q bits on completion of their accumulation.

Where one desires to present a full stored image in the raster frame, successive subgroupings of the Q bits are selected at M/N times the rate of practice of the conversion step. In the example, one steps linewise through frame buffer memory at four times the rate of signal conversion. In zoom operation, one would step through the frame buffer memory at lesser lines per conversion step, e.g., at the rate of M/N/R, where R is an integer greater than unity and as large as M/N. In the four magnification zoom operation example above discussed, one-fourth of the frame buffer memory is assigned to the display raster and R is selected accordingly as M/N or four.

While the particularly described system and practice of the invention above discussed deals with a single plane information pattern and a single frame of buffer memory whose stored bits contain single plane information, the invention extends to applications involving two or more frames of buffer memory in depth, i.e., multiple planes of memory. Such arrangements provide solution to a host of problems associated with color or grey scale applications. For example, existing color TV cameras, in simplest form, employ three target imaging means where each is swept in unison by three different beams all driven by a single sync generator. The color information is extracted from the signal by extracting data from three separate targets and then processing them through color and coding. In a system according to the present invention, instead of sweeping targets in vidicon, the multiple memory planes are swept simultaneously and color information is made up of the information that is drawn from three planes at once, respectively representing each of the primary colors. In graphic systems it is difficult to extract good color information from a three-plane system. What one tends to achieve is a choice of eight colors only. Through a system according to the invention, however, one is able to provide greyness of intensity information to each of those colors such that a much wider range of color mix possibilities is achievable. Further, the boundaries between those colors will be shaded appropriately. Thus a solution for color and grey scale problems for color edges, transparency, texturing, etc., becomes simplified.

While the invention has been described particularly in connection with vector-generation and raster scan display of frame buffer storage of line information, the invention of course has broader applicability. Various changes may be introduced to the foregoing without departing from the invention. Thus, the described and discussed preferred embodiment and practice are intended in an illustrative and not in a limiting sense. The true spirit and scope of the invention is set forth in the following claims.

What is claimed is:

1. In a method for effecting display of an image on a display unit of N image raster lines, the steps of:
   (a) storing said image in M stored lines of digital bits, M being selected as an integral multiple of N;
   (b) selecting a digital bit from each of Q of said M lines, Q being selected as an integer exceeding unity;
   (c) converting said Q bits selected in said step (b) into an analog signal by individually weighting said bits; and
   (d) using said analog as an intensity control signal for a bit in a one of said N raster lines of said display unit.

2. The invention claimed in claim 1 wherein such weighting practice is a Gaussian distribution weighting of said bits.

3. The invention claimed in claim 1 wherein said step (b) is practiced by selecting said Q bits in sequential subgroupings and by accumulating such subgrouped bits at the rate of M/N times the rate of practice of said signal conversion step.

4. The invention claimed in claim 3 wherein the rate of selection of said subgroupings is M/N/P times the rate of practice of said conversion step, where P is a number greater than unity and less than or equal to M/N.

* * * * *